Jan. 8, 1952 W. BORNEMANN ET AL 2,582,001
PHOTOGRAPHIC PRINT MAKING MACHINE
Filed June 22, 1949 9 Sheets-Sheet 1

WILLIAM BORNEMANN
DONALD J. ALBERT
INVENTORS

BY

ATTORNEYS

Jan. 8, 1952   W. BORNEMANN ET AL   2,582,001
PHOTOGRAPHIC PRINT MAKING MACHINE
Filed June 22, 1949   9 Sheets-Sheet 2

WILLIAM BORNEMANN
DONALD J. ALBERT
INVENTORS
BY
ATTORNEYS

Jan. 8, 1952     W. BORNEMANN ET AL     2,582,001

PHOTOGRAPHIC PRINT MAKING MACHINE

Filed June 22, 1949     9 Sheets-Sheet 3

WILLIAM BORNEMANN
DONALD J. ALBERT
INVENTORS

BY
ATTORNEYS

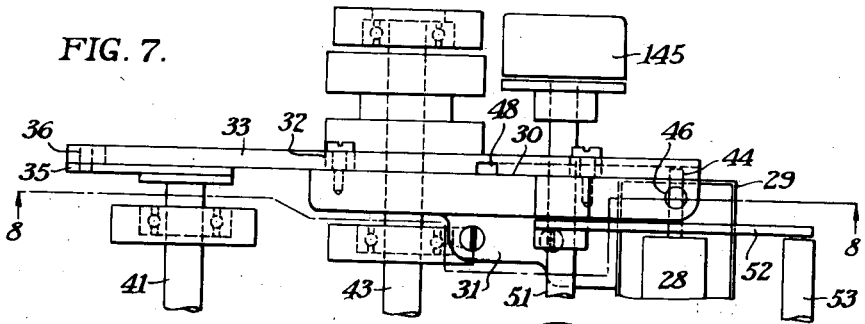
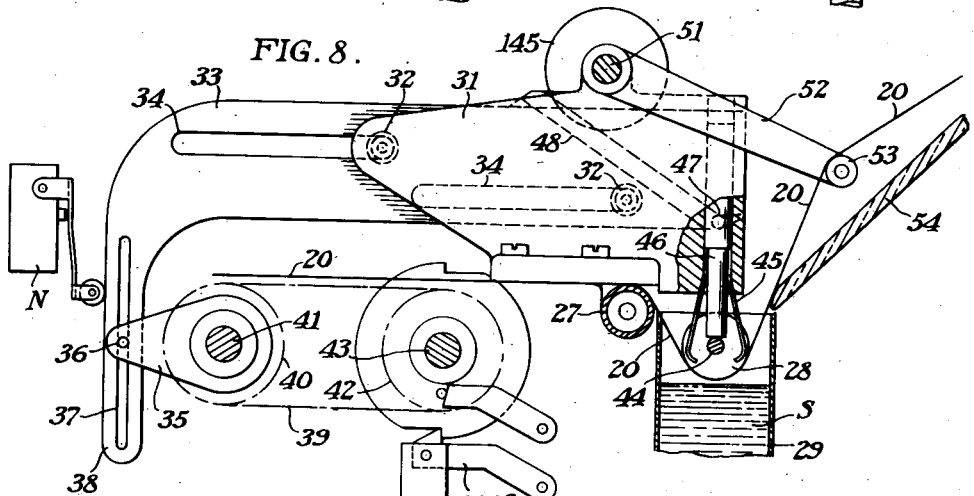
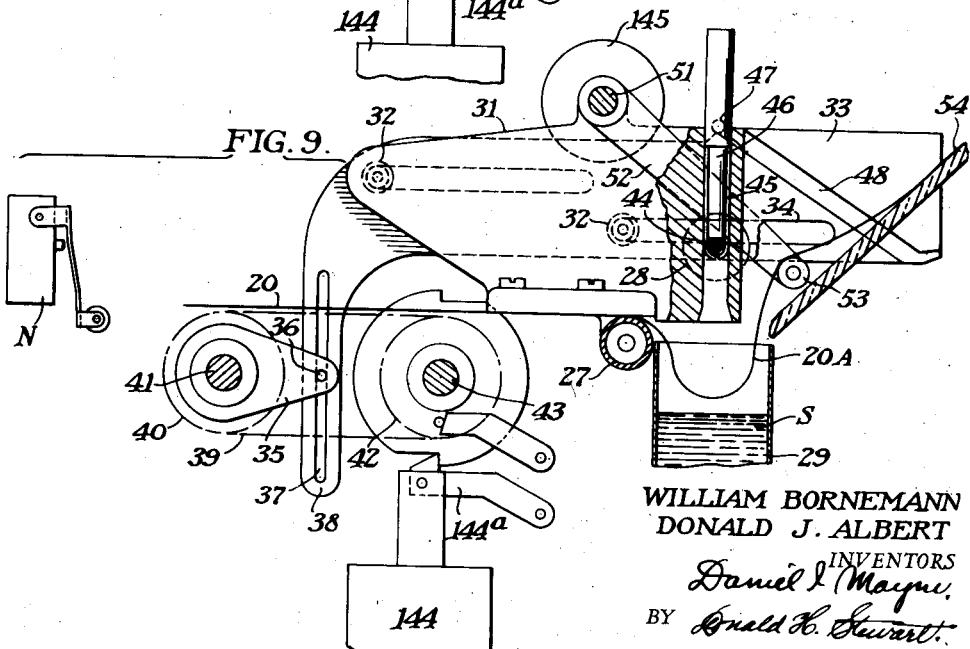

Jan. 8, 1952 W. BORNEMANN ET AL 2,582,001
PHOTOGRAPHIC PRINT MAKING MACHINE
Filed June 22, 1949 9 Sheets-Sheet 5

WILLIAM BORNEMANN
DONALD J. ALBERT
INVENTORS

BY
ATTORNEYS

Jan. 8, 1952 W. BORNEMANN ET AL 2,582,001
PHOTOGRAPHIC PRINT MAKING MACHINE
Filed June 22, 1949 9 Sheets-Sheet 6

WILLIAM BORNEMANN
DONALD J. ALBERT
INVENTORS
BY
ATTORNEYS

Jan. 8, 1952 W. BORNEMANN ET AL 2,582,001
PHOTOGRAPHIC PRINT MAKING MACHINE
Filed June 22, 1949 9 Sheets-Sheet 7

WILLIAM BORNEMANN
DONALD J. ALBERT
INVENTORS

BY
ATTORNEYS

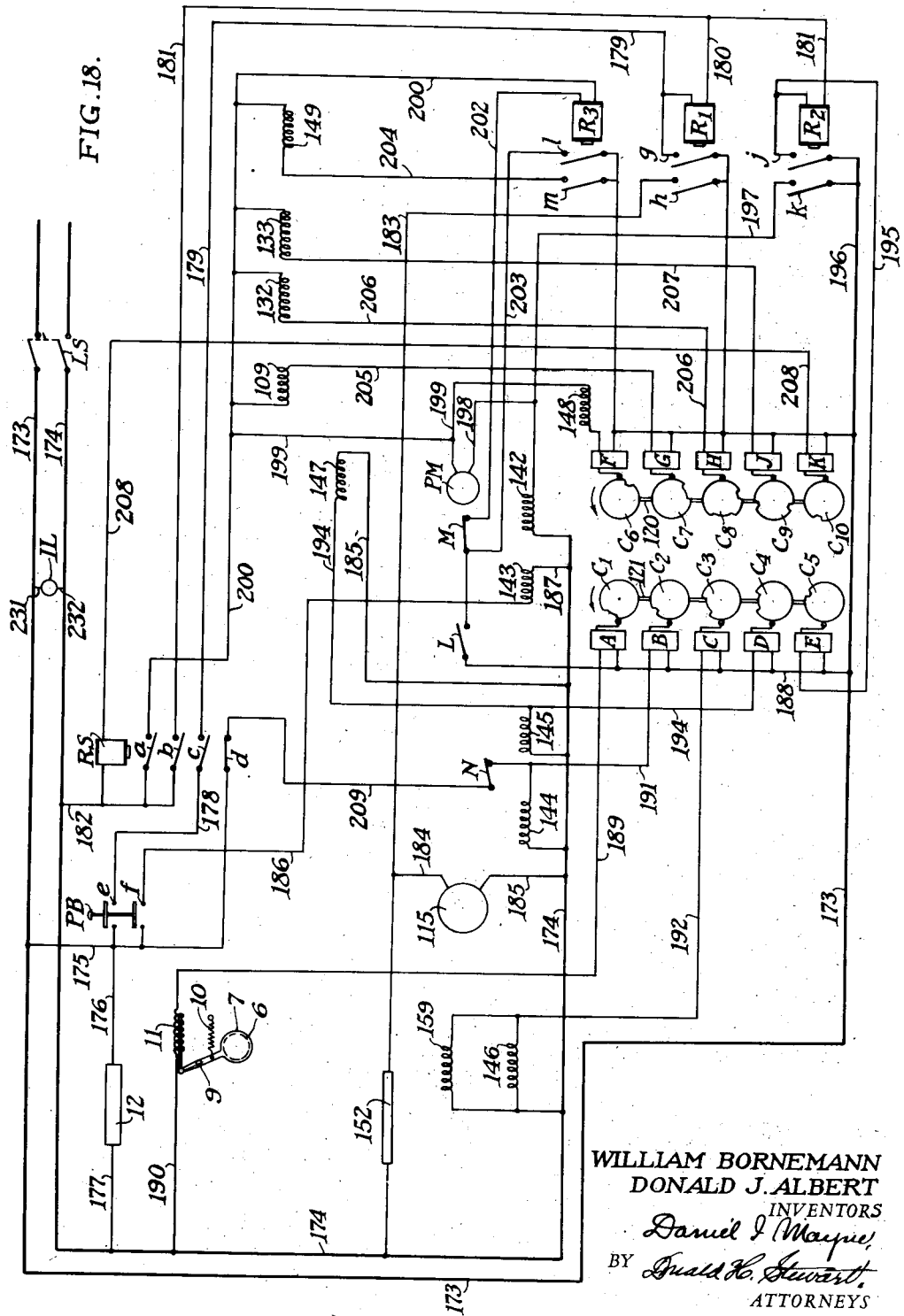

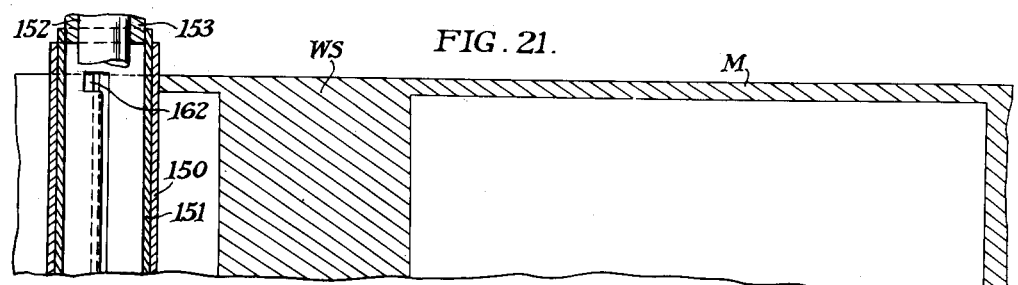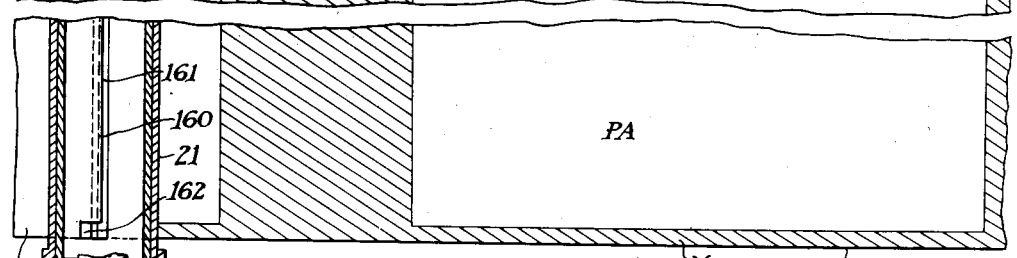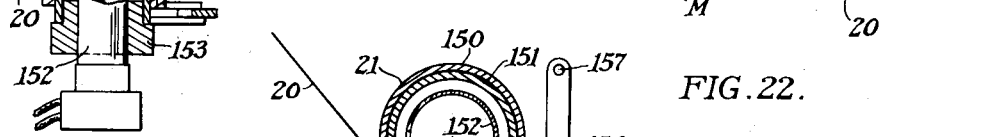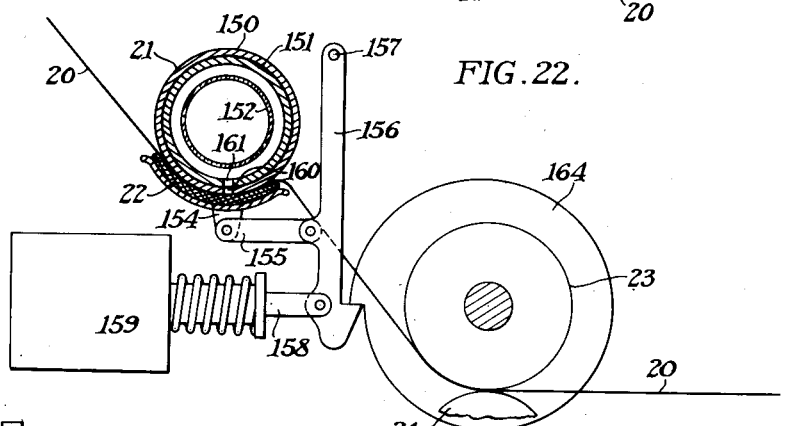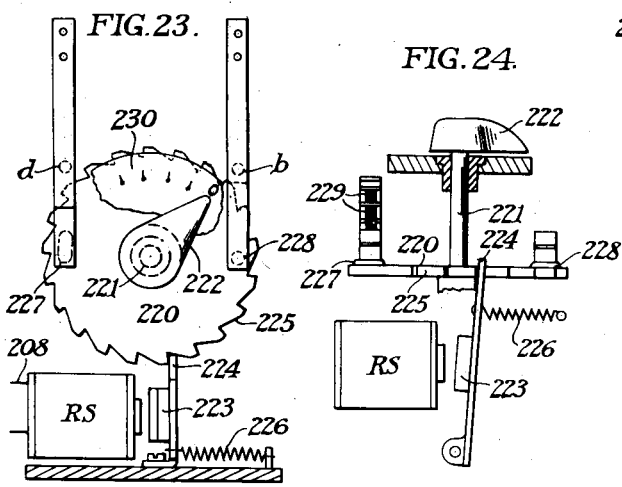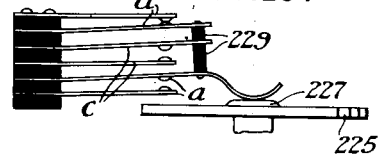

Patented Jan. 8, 1952

2,582,001

UNITED STATES PATENT OFFICE 2,582,001

PHOTOGRAPHIC PRINT MAKING MACHINE

William Bornemann and Donald J. Albert, Rochester, N. Y., assignors to Eastman Kodak Company, Rochester, N. Y., a corporation of New Jersey Application June 22, 1949, Serial No. 100,636

18 Claims. (Cl. 101—131)

This invention relates to photographic printing machines and particularly to a machine for making a photographic reproduction from copy material by a transfer system. One object of our invention is to provide a machine in which one or a plurality of copies may be made from a damp negative. Another object of our invention is to provide a machine in which the final sheet may be processed with a minimum amount of solution while contacting a negative. Another object is to provide a machine in which the final print is made on a transfer paper which receives an image-bearing layer through intimate contact with a damp negative. Still, another object of our invention is to provide a machine by which either one or a plurality of prints may be made from a single negative. A further object of our invention is to provide a machine for automatically increasing the contact pressure between the receiving sheet and the negative for each successive print. A further object of our invention is to provide a machine in which a means is provided for moving the dampened negative to and from a position in which a receiving sheet is applied to the negative by pressure. A still further object of our invention is to provide a means for eliminating or minimizing difficulties due to expansion and shrinkage as the negative sheet and the receiving sheet are processed and passed through the machine. A still further object of our invention is to provide a mechanism for moving the dampened paper through the machine. A still further object of our invention is to provide a machine in which the various moving, processing, pressing, chopping, and delivering operations are all carried out automatically and in the proper timed relation. Another object of our invention is to provide a machine in which the parts are returned to a normal position each time a fresh negative is to be used. A still further object of our invention is to provide a machine in which one or a number of prints may be made in accordance with the setting of the machine, and other objects will appear from the following specification, the novel features being particularly pointed out in the claims at the end thereof.

This invention is particularly directed to a machine for making prints by a somewhat unusual photographic process in which a light-sensitive emulsion coated sheet is exposed and developed by a suitable treatment bath to provide a differentially hardened image-bearing sheet which will hereafter be referred to as a negative. While any suitable base, such as paper or pyroxylin, may be used, since this process is particularly desirable for producing inexpensive prints, we prefer to use paper. The term "negative," as used herein, will include any suitable base with an emulsion which is light-sensitive and having the desired characteristics coated thereon.

After the negative has been processed, preferably in a one-solution bath, the differentially hardened image-bearing surface of the negative is positioned on a flat, rigid plate, and a print is produced therefrom by rolling a sheet of receiving paper into intimate contact with the processed and still damp negative. This receiving sheet is then stripped from the negative so that the image-bearing receiving sheet carries a positive of the negative image as it is stripped from the negative and moved to the exit of the machine in a substantially dry condition. The receiving sheet is also preferably inexpensive and may consists of a more or less absorbent sheet of paper, preferably without any photographic coating thereon, and preferably with but little filler or sizing. Such paper may be ordinary writing paper.

The above photographic process is fully described in a number of applications, among which is Serial No. 783,914 for Photomechanical Copy Method, Yutzy and Yackel, filed November 4, 1947. Reference may be had to this application for a more complete description of the process, the processing solutions required, and the method of carrying out this copying method.

Coming now to the drawings wherein like reference characters denote like parts throughout:

Fig. 7 is a fragmentary top plan view of a movable slide member which controls the position of a processing roller and a paper guide roller;

Fig. 8 is a fragmentary side elevation of the slide mechanism shown in Fig. 7 with the negative paper lying above the fluid treatment tank and being held away from the angularly disposed pressure plate before a section of the negative paper is processed;

Fig. 9 is a view similar to Fig. 8 but with the parts in a different position, the processing roller being held out of contact with the negative paper, as occurs after an area has been processed and as the receiving sheet is to be rolled against the negative;

Fig. 18 is a schematic circuit diagram showing the control circuit and the means for operating the various parts in timed relationship;

Fig. 21 is a top plan showing a portion of the sensitized paper sheet and means for controlling the edge exposure;

Fig. 22 is a partial longitudinal section thereof;

Fig. 23 is a top plan of the step relay and contacts;

Fig. 24 is a side elevation of the relay;

Fig. 25 is an elevation of one set of relay contacts shown in Figs. 23, 24; and

Fig. 26 is a side elevation of a second set of contacts.

It is particularly desirable to produce inexpensive copies of copy material, such as printed sheets, drawings, and the like, minimizing the use of photographic light-sensitive material as much as possible, and producing the final copies as positives of the original on inexpensive paper. Our machine is particularly designed for producing such prints in accordance with the Yutzy and Yackel process, referred to above.

Our invention comprises a machine having means for exposing copy material on a photographic light-sensitive sheet, making the usual negative latent image thereon, and then processing the latent image, and, while the latent image is still damp, rolling under pressure a sheet of somewhat absorbent paper against the latent image which has been differentially hardened. The paper, or receiving sheet, is then stripped from the negative and is automatically moved outwardly; the entire operation, in the present instance, taking about 40 seconds to perform. If only a single copy is required, this may be made, but if a plurality of copies are required, the machine may be so set and a plurality of receiving sheets will be rolled against the negative, preferably rewetting the negative before each rolling and passing the prints in succession through the print opening of the machine. Additional prints can be made in from three to four seconds with the present embodiment of our invention. The necessary timing and mechanism for moving the various parts are accurately controlled, in this instance electrically, so that the operator merely presses a button after setting the machine for the desired number of prints and the machine carries out the various steps in the proper timed relationship.

Figure 1:
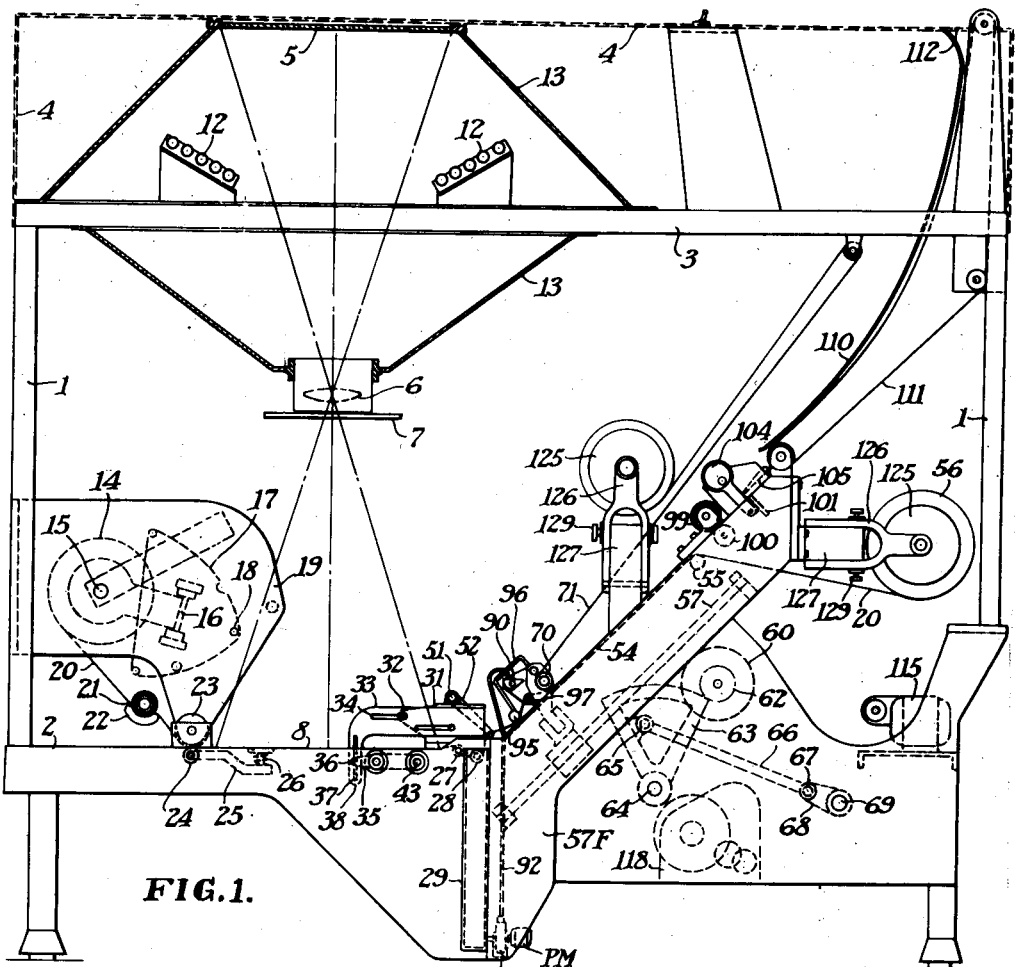
Fig. 1 is a side elevation of a machine constructed in accordance with and illustrating a preferred embodiment of our invention, the machine casing being removed and parts of the apparatus being omitted for the sake of clearness.
Figure 2:
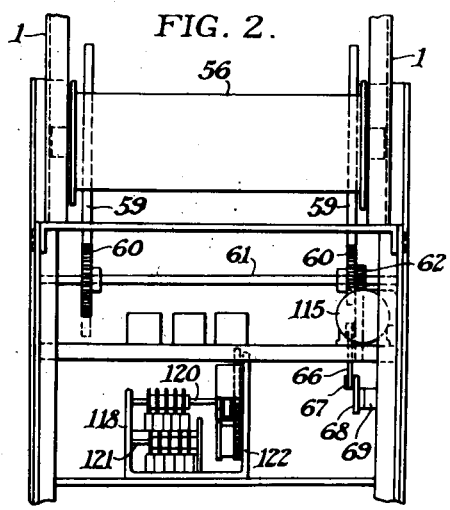
Fig. 2 is a fragmentary end elevation showing a portion of the machine disclosed in Fig. 1.
Figure 3:
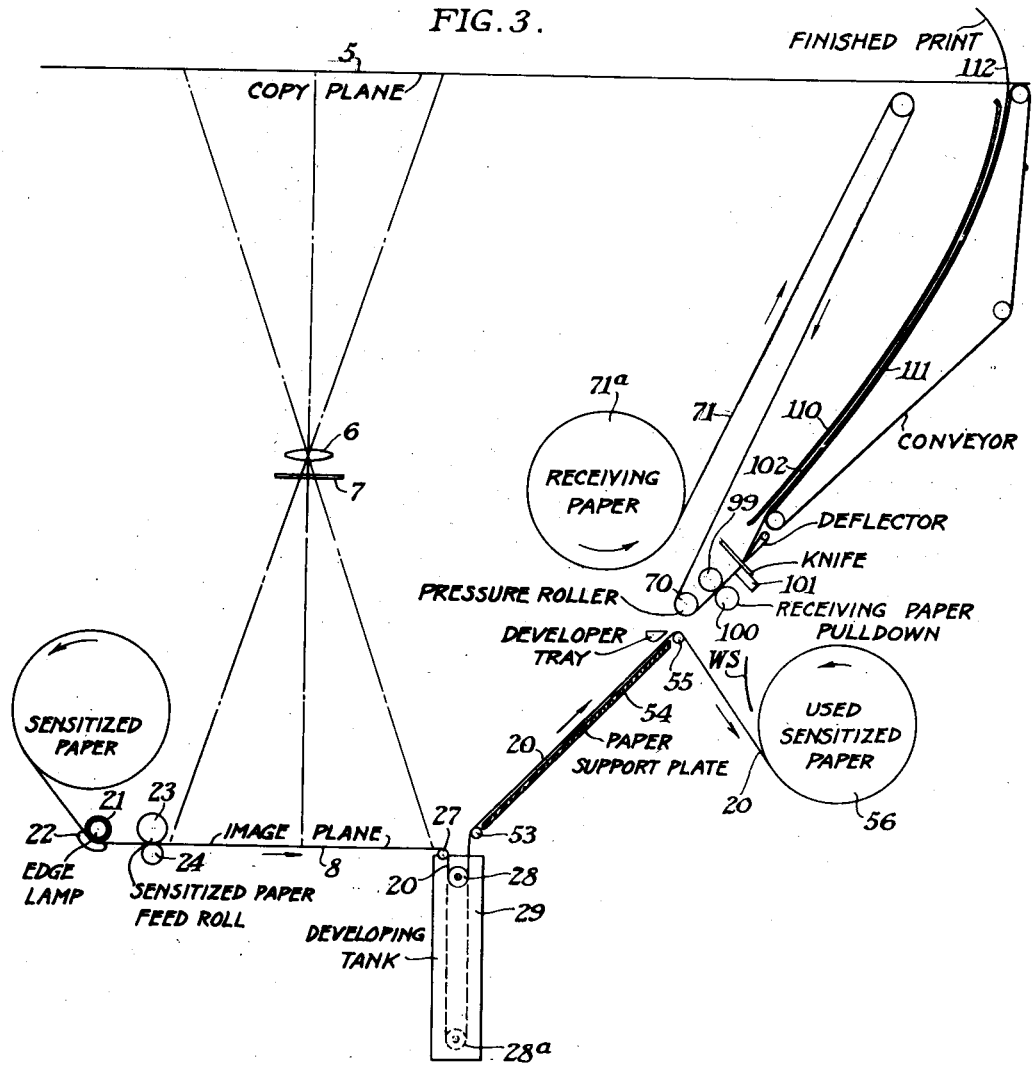
Fig. 3 is a schematic drawing showing the various operative parts of the machine schematically in their proper relationship.

As indicated in Fig. 1, our machine may comprise a frame 1 having a lower table support 2 and an upper table support 3. A portion of a casing 4 is shown on the machine, this casing preferably enclosing the entire mechanism and the machine frame. On the top of the casing there is a platen 5, preferably in the form of a glass plate which defines the copy plane, as indicated in Figs. 1 and 3, and beneath this plane there is an objective 6, shutter 7, and an image plane 8, all preferably in axial alignment. The shutter 7, as shown in Fig. 18, may be a simple leaf shutter pivoted at 9 and held by a spring 10 in a normally closed position over the objective 6. A solenoid 11 may be actuated to open the shutter and make an exposure, after which the shutter may be closed by the spring 10. There are a plurality of lamps 12 arranged in a lamphouse 13 beneath the platen 5 to illuminate the copy material and any desired means may be used, such as a well-known pressure platen, not shown, to hold the copy flat on the platen 5.

The negative material 20 may be provided in the form of a roll supported by suitable movable trunnions 15 which may be hingedly attached at 16 to a segment 17 pivotally attached at 18 to a supporting plate 19. Thus, one plate may be swung outwardly to facilitate loading a spool of negative material into place, but since this particular support forms no part of the present invention it will not be further described.

The negative material 20 is led from the roll 14 beneath a border printing device 21 against which it is held by a presser member 22. This border printing device fogs the longitudinal margins "M" and transverse bars "WS" between the edges on the negative material, as best shown in Figs. 21 and 22; this being done both to provide clear, white margins on the final print, and to provide areas of hardened gelatin which facilitate the movement of the strip through the machine. The sensitized material, when made in accordance with the invention set forth in the application previously referred to, is so constituted that it will become hard during processing if it has been exposed to actinic light, but any parts not so exposed wash off or are very soft and are, therefore, likely to impede the action of the moving parts of the machine by sticking to the rollers.

The supporting plates 19 support a measuring roll 23, there being a pressure roll 24 carried by the arm 25 pressed against the measuring roll by a spring 26. This measuring roll serves as a pull-down to push the negative material 20 across the image plane 8 when the roll is turned the required number of times, as will be hereinafter more fully described. From the image plane 8, the negative material 20 may be pushed over a guide roller 27, beneath a processing roller 28 and over solution in a tank 29. Referring to Figs. 7 to 9, where the control for the processing roller 28 is shown, it will be noticed that the negative paper 20 is passed between the sides 30 of a member 31 fixed to the support. This member 31 carries rollers 32 on which a pair of side plates 33 may slide, slots 34 engaging the rollers 32 and moving thereon from the Fig. 8 to the Fig. 9 position when a crank 35 carrying a pin 36 engaging a slot 37 and arm 38 of the slide members 33 is rotated 180°. This rotation may be caused by a chain 39 engaging a sprocket 40 on shaft 41, driving the crank and engaging a sprocket 42 on a shaft 43 which is driven in a manner to be later described.

When the negative paper 20 is being advanced, the parts are in the Fig. 9 position, and the processing roller 28 is held in a raised position by means of the trunnions 44 being engaged by the spring arms 45 which are at that time held in a raised position by the post 46. As indicated in Fig. 9, the post 46 carries a pin 47 engaging a cam slot 48 in a part of the slide 33 which moves when the slide moves to the Fig. 9 position, the spring arms 45 engage the trunnion 44 and lift the processing roller 28 to the Fig. 9 position. The negative paper which has been exposed is now advanced over the guide roller 27 and into a loop 20-A and, as the slide members 33 move to the Fig. 8 position, the pin 47 moves down the cam slot 48, lowering the roller 28 into contact with the negative material 20, as shown in Fig. 8. As the spring arms 45 separate, the roller is held merely by the negative paper, and as the paper advances the roller moves from the full-line position in Fig. 3 to the broken-line position at 28–a in this figure. A loop of the exposed negative material is thus drawn down into the solution "S" where it is processed for the required amount of time. This may be, for instance, from 15 to 20 seconds. It will be noticed that the slide 33 passes under a shaft 51 which is carried by a portion of the support, this shaft supporting a lifter arm 52 carrying a roller 53 lying beneath the negative material 20 and above a rigid plate 54 which is angularly disposed with respect to the slide. There is a rotary solenoid 145 on the end of shaft 51, the function of which is to move the lifting roller 53 from the Fig. 9 position to the Fig. 8 position.

When the negative sheet 20 is damp, or wet, it of course has very little strength and, in addition, it is apt to expand so that if an attempt were made to move this sheet over the angular supporting plate 54 and in contact with the plate, even if the sheet could be made to slip, it would not lie flat and it would lie in a wrinkled condition. We therefore support the sheet 20 above the plate, except at such times as when the receiving sheet is to be ironed thereon. It will be noticed from Fig. 3 that there is a guide roller 55 at the top of the angular plate 54 so that the negative material 20 may be suspended between these rollers except when the paper is being rolled on the used sensitized paper roll 56. Fig. 3 shows the receiving paper out of contact with the negative paper. During movement of the negative paper over plate 54, the wet paper 20 does not drag over or contact with the plate 54.

Figure 4:
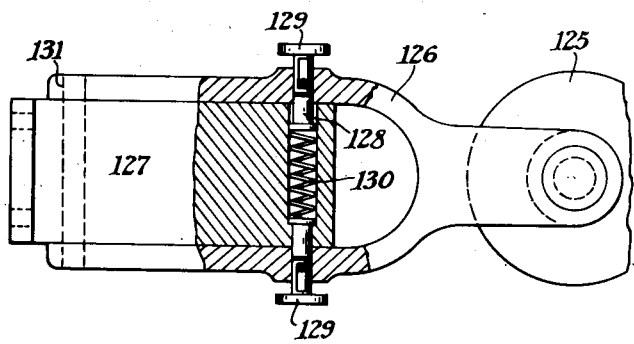
Fig. 4 is a fragmentary side elevation, partially in section, of one of the roll-holding supports used in the machine shown in Fig. 1.

Both the receiving paper supply roll 70ᵃ and the roll 56 on which the spent sensitized paper is wound, are supported on core plugs 125 (Figs. 1 and 4) in the ends of yokes 126 that are pivoted on fixed abutments 127 by trunnion pins 128. These pins are normally forced apart by springs 130 so that the yokes are aligned with the supports 127 and cannot be displaced from their roll-supporting positions. However, when tappets 129 are manually pressed inwardly, the trunnions are moved so that they no longer engage the supports 127. The core plugs then may be swung outwardly on pivots 131 to release the paper rolls and to receive new ones.

Figure 5:
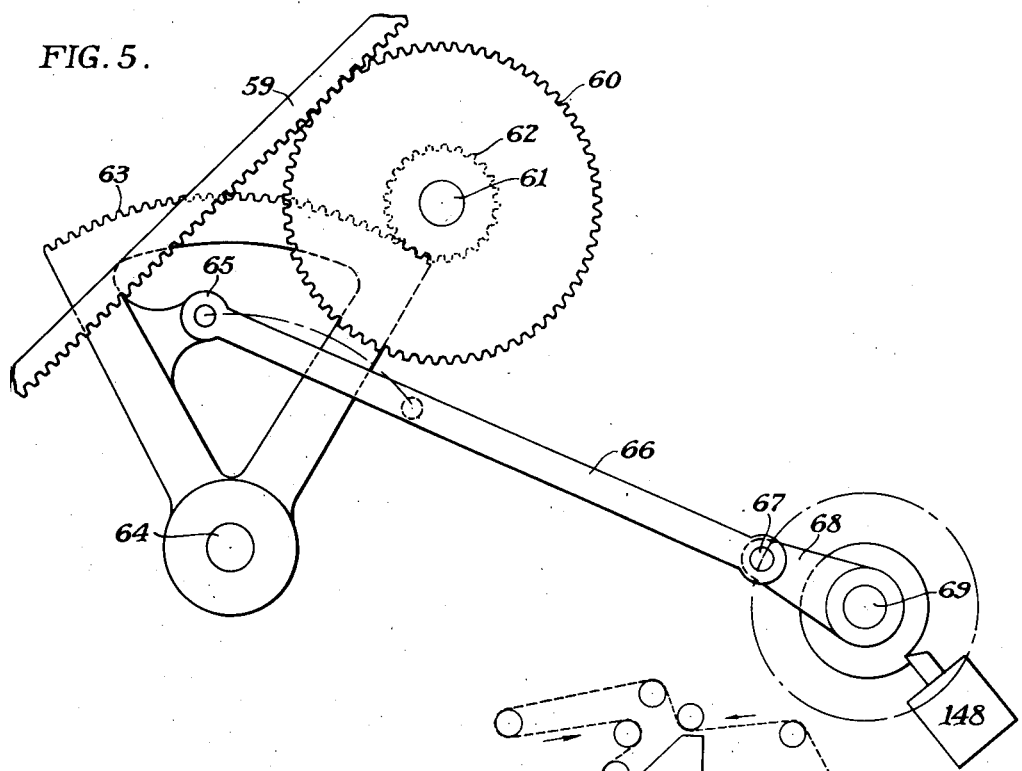
Fig. 5 is a fragmentary detail of the carriage-moving mechanism removed from the machine.
Figure 10:
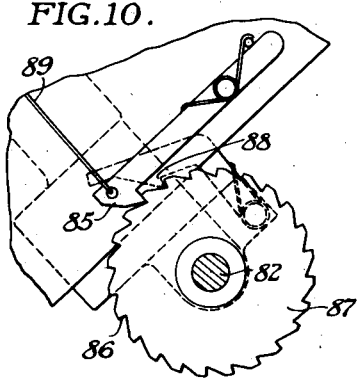
Fig. 10 is a fragmentary detail view of a portion of the roller tension increasing mechanism.
Figure 11:
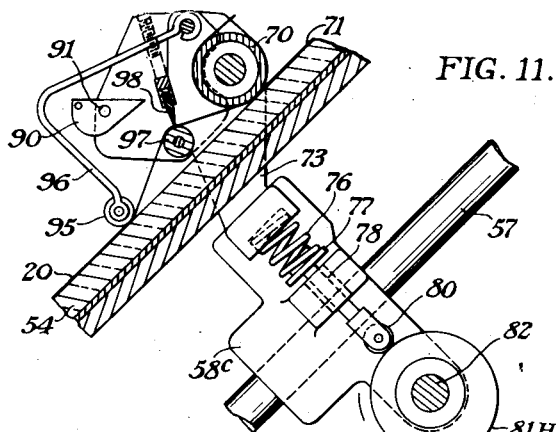
Fig. 11 is a fragmentary detail, partially in section, of the roller tensioning mechanism showing also the bucket for remoistening the negative.
Figure 12:
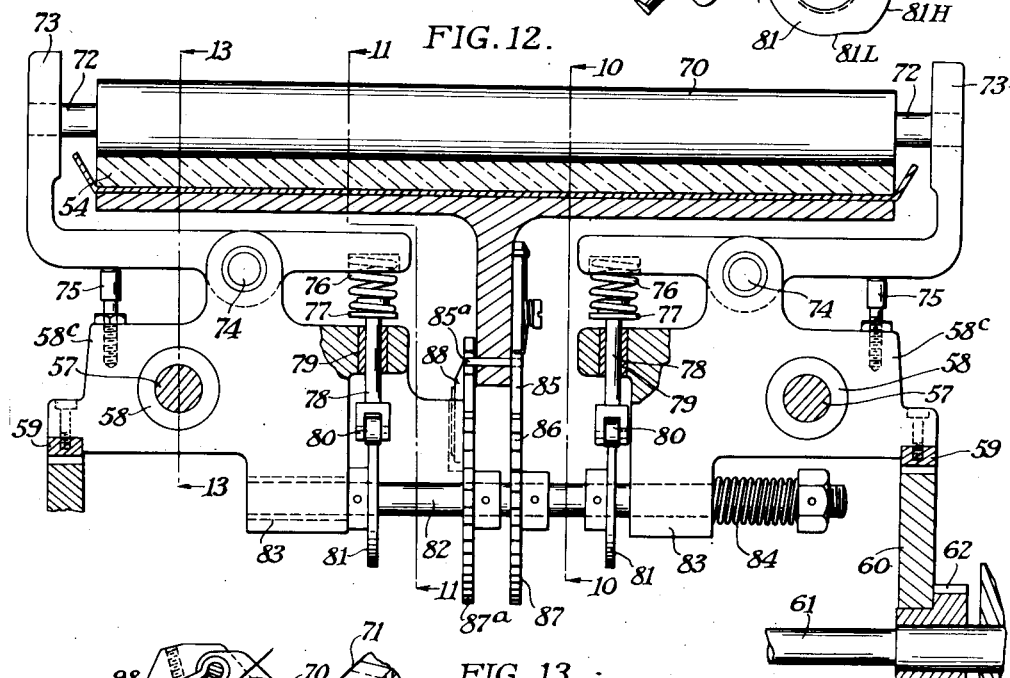
Fig. 12 is a fragmentary sectional view showing the roller tension increasing mechanism, and including the slideable support for the carriage and a portion of the carriage moving mechanism.

There is a movable roller carriage best shown in Figs. 10 to 13 adapted to press a sheet of receiving paper tightly in contact with the moist negative sheet 20, ironing the two sheets upon the angularly disposed flat glass plate 54. As shown in Fig. 12, the frame 57-F carries a pair of round rails 57 which are spaced apart and the carriage 58-C includes bearings 58 slideable on these rails. The carriage 58-C includes pairs of racks 59, one on each side; these racks contacting with gears 60 carried by a shaft 61 which in turn supports a pinion 62. This pinion may be driven by a gear sector 63 best shown in Fig. 5, the gear segment being adapted to rock on a stub shaft 64 and carrying a pivotal support 65 for connecting rod 66 pivotally attached at 67 to crank arm 68 which may be driven from shaft 69 in a manner to be later described. Thus, when the crank 68 makes a single revolution, the carriage moves a roller 70 downwardly, ironing a sheet 71 of receiving paper over the negative 20, and pressing it smoothly and tightly thereagainst. The carriage then returns to its starting point.

When only a single print is to be made from a negative, the roller 7 will iron the receiving sheet against the negative on its downward trip over the inclined plate, and will remove the transfer paper from the negative when it moves upwardly. However, if a series of prints are to be made from the same negative, it is preferable to increase the pressure on the pressure roller 70 each time an additional print is made, because at each extra print an additional layer of emulsion is carried away from the negative and, therefore, slightly greater pressure on the roller 70 is desirable for each print. This compensates for the gradually lowering surface of the soft and partially hard gelatin on the negative as the roller makes successive trips across the negative. The means for obtaining the desired pressure on the roller 70 will now be described.

In order to evenly press the roller 70 against the glass plate 54 for the paper strips laid thereon, the trunnions 72 of the roller, Fig. 12, are carried by supporting arms 73. These arms are pivotally mounted at 74 on the slide carriage and may rest against adjustable stop pins 75 under the pressure of springs 76 which may be compressed to variable extents in the following manner. The lower ends of these springs rest on the heads 77 of shafts 78 slidable through bearings 79 in accordance with the position of the rollers 80 which are controlled by means of cams 81 carried by the shaft 82. This shaft is journalled in bearings 83 of the carriage and includes a spring 84 anchored at both ends and adapted to turn the shaft 82 in one direction, resisting movement thereof in an opposite direction.

Each time the carriage moves to its upper extent of movement, a latch member 85, best shown in Fig. 10, engages a tooth 86 of a ratchet 87 carried by the shaft 82 and since the pawl 85 is stationary with respect to the ratchet, it is moved one step when the carriage starts downward. A holding pawl 88 on a companion ratchet 87ᵃ normally prevents the ratchet from moving rearwardly so that for each successive print additional compression is placed on the spring 76 and, consequently, on the roller 70. If four prints are made, four successive states of compression are obtained. Actually, while the lever arms 73 press harder on the trunnion 72 of the roller 70, the roller cannot move farther down than permitted by the plate 54 so that there is no tendency to bind between the bearings and the trunnions 72.

After the successive prints are made, the pawls 85 and 88 may be released, permitting the spring 84 to return the cams 81 to their lowest pressure position represented by 81–L, the low part of the cam. 81–H represents the highest part of the cam and consequently the part which will cause the greatest compression.

The pawl 85 is released by a solenoid 146, not shown in the detail drawings. The core of this solenoid has a cable 89 attached to it which is guided over suitable sheaves and attached to the pawl. The solenoid operates at a required point in the cycle, as described later. A pin 85ᵃ on pawl 85 picks up pawl 88 so that both pawls are freed. The spring 84 then "unwinds" shaft 82 and returns roller 70 to a normal-pressure position.

Figure 19:
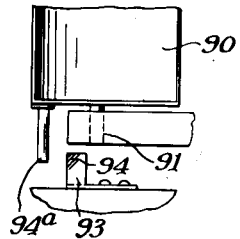
Fig. 19 is a fragmentary top plan of one end of a movable developer tray.
Figure 20:
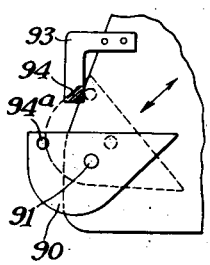
Fig. 20 is a side elevation of Fig. 19 showing means for tilting the tray.

Each time the carriage moves down to press the receiving sheet against the negative sheet, a bucket 90, pivoted to the carriage at 91, is brought downwardly and under the ends of one or more pipes 92 which may be supplied with processing fluid from tank 29 by means of a pump P driven by a motor PM, as indicated in Fig. 1. Thus, the buckets 90 carry a measure of treatment fluid to the uppermost position as the buckets move upwardly, and they move behind a pair of spring latches 93 (Figs. 19, 20) which have beveled ends 94 over which pins 94ᵃ on the bucket may ride as the latter moves upwardly, so that when the carriage starts down a second time, the bucket is rocked by the pins 94 catching the upper or rear edge of the springs 93, to drop its load behind the dam roller 95 carried by the arms 96, so that as the carriage moves down, this roller retains a smooth bead of solution which flows over the entire surface of the negative material 20. This rewets the negative material just in advance of the pressure on the receiving sheet, so that the receiving sheet may pick up an image therefrom. When the carriage moves up, the arms 96 may allow roller 95 to move up off plate 71 as the negative material is stripped from the plate 71 by roller 97 which is spaced from the plate.

Figure 13:
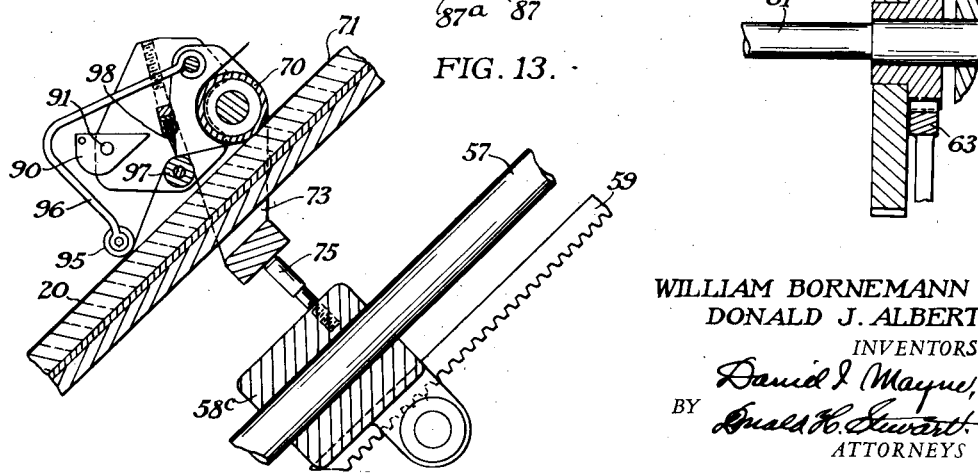
Fig. 13 is a transverse sectional view showing the receiving sheet pressure roll and a portion of the movable carriage carrying the roll and including the remoistening bucket, the dam roller, and a roller squeegee.
Figure 14:
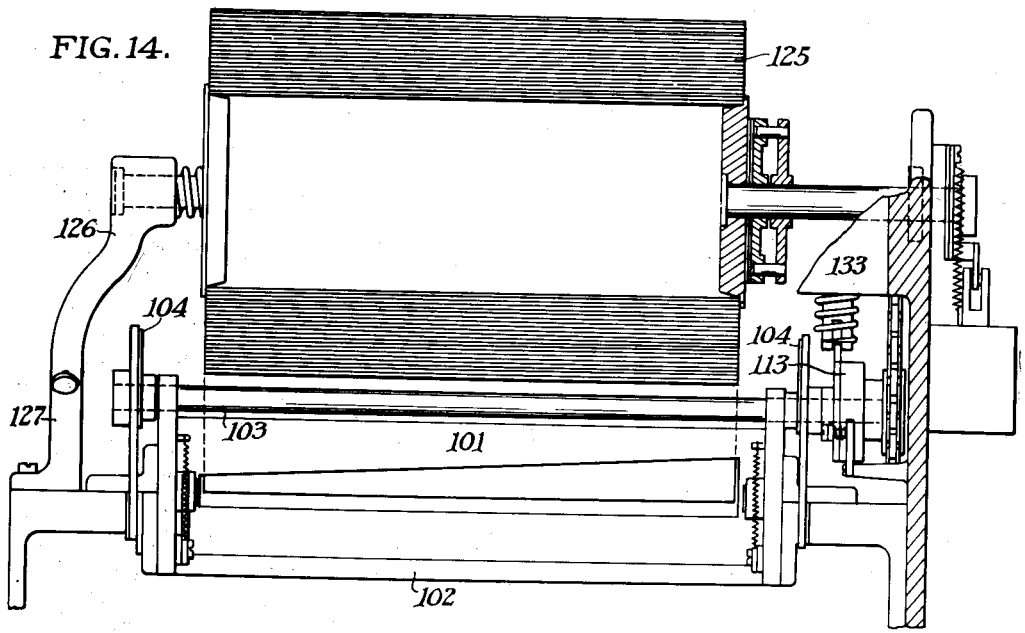
Fig. 14 is a fragmentary detail section showing the receiving paper roll, the chopper knife and associated driving mechanism.

It will also be noticed from Figs. 11 and 13 that the negative sheet 20 passes under the dam roller and over a guide roller 97 above which a rubber squeegee 98 is supported. Consequently, if too much fluid remains on the sheet 20, this is squeegeed off before the receiving paper 71 is rolled thereon.

After the required number of reproductions have been made from a single negative, the waste material is wound upon used sensitized paper roll 56 shown in Fig. 3. At the same time, the receiving paper is wound up and is passed between measuring rollers 99 and 100 shown in Fig. 3. These measuring rolls move the receiving paper to the knife which consists of a fixed blade 101 and a movable blade 102. The movable blade 102 is operated by a shaft 103 carrying an eccentric 104 for reciprocating the movable knife, and controlled by a clutch 113 which is released by a solenoid 133.

The border printing and waste fogging device indicated as a whole by numeral 21 in Fig. 3 is shown in detail in Fig. 21 and comprises two concentric tubes, the outer one 150 being oscillatable through a small arc about the periphery of the inner tube 151 which is fixedly mounted on supports 153. A tubular light source 152 (incandescent or fluorescent) is supported within the inner tube, and, as shown in Fig. 18, is illuminated as long as the main line switch LS is closed.

Tube 150 has an arm 154 at one end (Fig. 22) connected by a link 155 with a lever 156, pivoted at 157 on a fixed support, not shown. This lever is attached to the core 158 of a solenoid 159, so that when the latter is energized an over-running clutch 164 is permitted to revolve, carrying with it feed roll 23 which meters the sensitized sheet 20.

The inner tube 151 has a longitudinal slot 161 and the outer tube 150 has a slot 160, both near the bottoms of the tubes, and within the area of the pressure pad 22. These slots are normally coincident, as in Fig. 22, but whenever solenoid 159 is energized, they will be misaligned as in Fig. 21, so that light from the lamp 152 cannot reach the sheet 20 through the main portions of the slots. The ends of slot 161 are extended circumferentially as at 162 so that light can at all times reach and "fog" the marginal portions M to provide a white border on the transfers or prints.

When the machine is running, the sensitized sheet 20 is pulled along by roll 23 when it is driven by clutch 164. The length of time roll 23 revolves is controlled by the notch in cam C₃, which closes switch C. This notch is so designed that the roll will make slightly more than two revolutions while the solenoid is energized, and slightly less than one revolution more after the solenoid is deenergized and before the clutch stops rotating. Therefore, the slots 160 and 161 are out of register while the printable area PA is passing under the tube 150, and are allowed to register again after that area has passed the slots, so that the "inbetween" area or waste portion WS will be exposed to the light. Three full revolutions of roll 23 carry the sheet 20 a distance equal to the length of PA plus the length of WS.

Because of this "fogging" of the areas WS and M, the emulsion thereon will not be dissolved when the sheet 20 enters the fluid-treating tank 29, because the nature of the process is such that light-struck emulsion is harder than if unexposed. Thus, the rolls, plates, etc., beyond the developing stage are not "gummed up" by loose particles of emulsion that are soft and sticky. Final print borders remain white.

Figure 15:
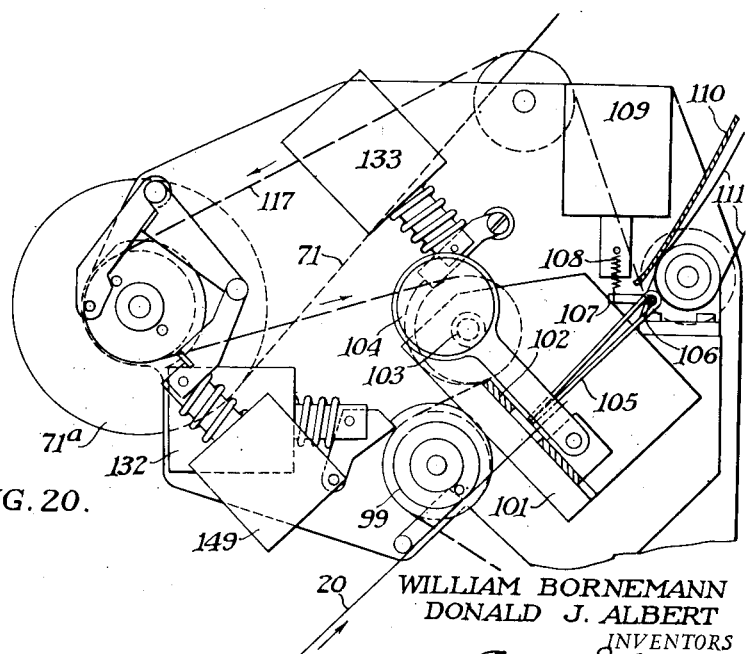
Fig. 15 is a fragmentary detail section showing the paper chopper, the paper deflector, and the associated operating solenoids.

Since the receiving paper has waste areas between exposures, these must be chopped off so that the knife is operated by mechanism to be later disclosed to first cut off the waste area and then cut off the picture-bearing area. In order to dispose of the waste area, a deflector 105 is mounted adjacent the knife and pivoted at 106 to the frame; this deflector having an arm 107 held upwardly by a spring 108. The plunger of a solenoid 109 may be actuated to move the deflector below the knife, in which case the sheet will pass upwardly between a sheet-metal guide plate 110, shown in Fig. 3, and a conveyor belt 111; this belt relaying the completed print through the print exit 112 in the top of the machine. When the deflector 105 is in the Fig. 15 position, it deflects that area of the receiving sheet, which is waste material, downwardly, and when chopped off, the waste piece of material WS drops downwardly, as indicated in Fig. 3, into the convolutions of the negative material 20 which has been used and which is wound into a roll 56, as shown in Fig. 3. When the print-bearing area PA is chopped off by a second actuation of the knife, the print passes upwardly over the deflector 105 as above explained, and is moved outwardly to the print-delivery opening 112.

Figure 6:
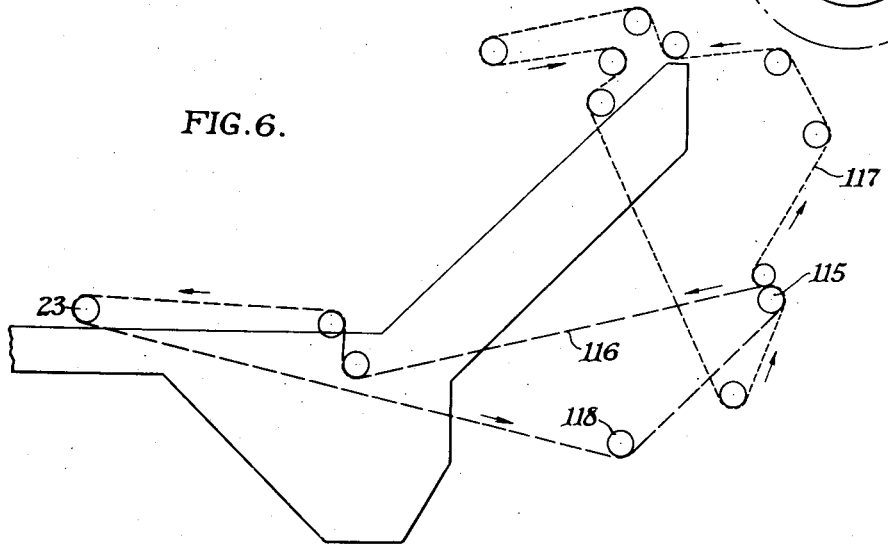
Fig. 6 is a schematic chain diagram showing the chains which drive the machine, and their relationship to driven and idler sprockets.

As shown in Figs. 6 and 18, there is a main drive motor 115. This motor drives two chains, chain 116 and chain 117. The first-mentioned chain drives the negative material 20, measuring roll 23 mechanism, drives the slide 33, and drives the control mechanism shown broadly as 118 in Fig. 1. The second chain 117 drives the paper take-up mechanism, the receiving paper supply, the knife, the receiving paper pulldown, and the crank moving the carriage, and is a so-called "duplex" chain, that is, either the inside or outside may engage a sprocket.

Figure 16:
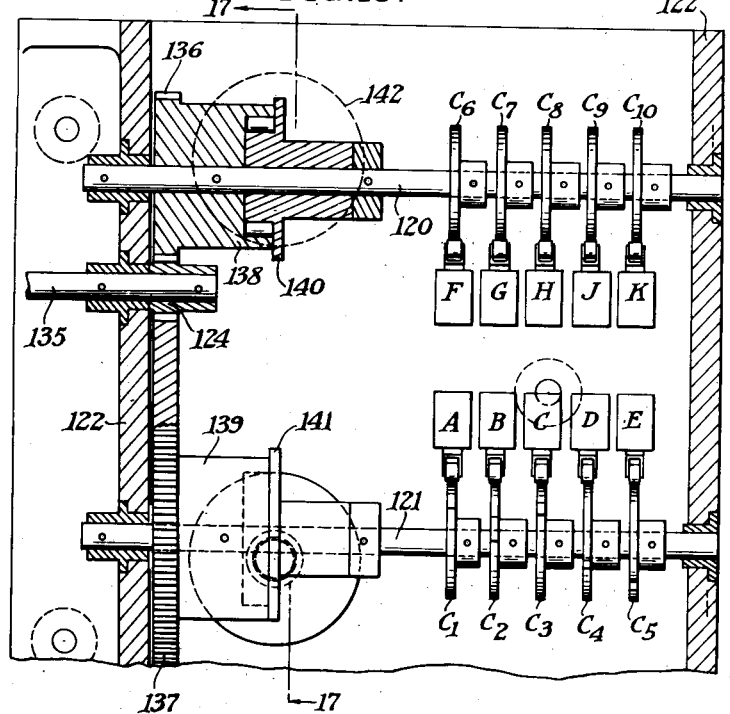
Fig. 16 is a fragmentary sectional detail through a portion of the control switch-operating mechanism.
Figure 17:
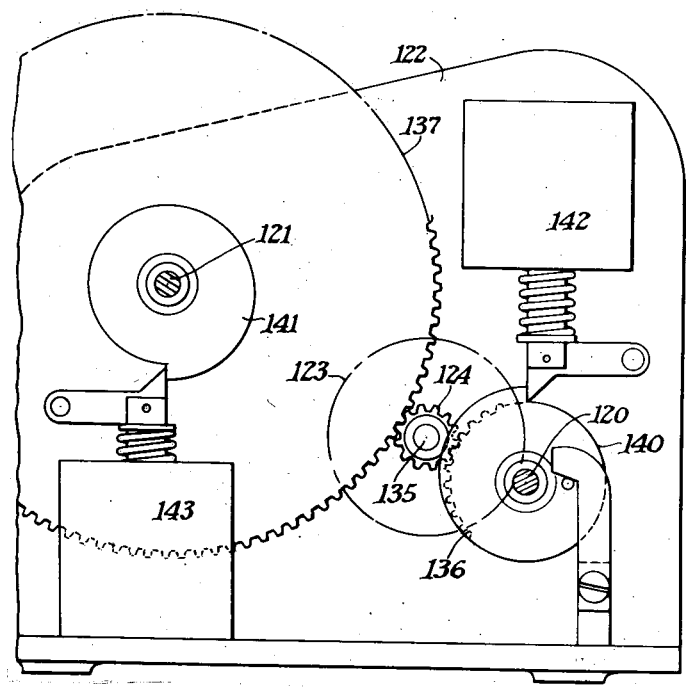
Fig. 17 is a side elevation of the exposure and developing control mechanism.

The control mechanism 118 is best shown in Figs. 16 to 18 inclusive, and it may include a pair of spaced shafts 120 and 121 rotatably carried in a suitable frame 122. A sprocket 123 (indicated by broken lines in Fig. 17) through a pinion 124 on the sprocket shaft 135 drives gears 136, 137 attached to the driving elements 138, 139 of clutches 140, 141, arranged respectively, on shafts 120, 121. The clutches 140, 141 are released when solenoids 142 and 143 are energized, and may make one or more revolutions in accordance with the period of energization of the solenoids.

The shaft 121 carries a series of cams, $C_1$, $C_2$, $C_3$, $C_4$, $C_5$ arranged to close microswitches A, B, C, D, E. Shaft 120 has a similarly arranged group of cams $C_6$, $C_7$, $C_8$, $C_9$, $C_{10}$, and microswitches F, G, H, J, K, operable thereby.

The step relay (Figs. 18 and 23) has a coil RS and an armature 223, the free end 224 of which may engage any one of a series of teeth 225 in the periphery of a disc 220 which rotates on a shaft 221. Each impulse through RS advances the disc one tooth. The operator may rotate a pointer 222 to the desired numeral on a scale 230 and a corresponding number of completed prints will be turned out through slot 12 automatically without further attention.

The disc 220 has an elongated raised boss 227 and a shorter one 228. A series of contact springs indicated in Figs. 18, 25 and 26 are adapted to be raised by these bosses when the disc approaches and arrives at the "zero" position. With the lower springs on the bosses, the contact pairs RSa, RSb and RSc will be opened and the single pair RSd closed, as in Fig. 18. As soon as the disc is turned to select a number, the contacts RSa, RSb, RSc close and RSd opens.

It will be seen from Fig. 18 that the push-button PB cannot initiate a cycle unless contacts $d$ are closed, as they constitute one element in the circuit through "N" and "B."

The operation of the circuit is best illustrated by the wiring diagram in Fig. 18.

When switch LS is turned to "on" position, the lights 12, illuminating the original, are turned on through wires 173, 174, 175, 176, and 177, and the indicator light IL is turned on through wires 231 and 232.

The stepping relay RS is set for the number of prints desired closing contacts RSa, RSb, and RSc, and opens RSd.

The cycle is started by pushing the push button PB which closes contacts PBe and PBf. Relay coil $R_1$ is energized through 173, 175, PBe, 178, RSc, 179, 180, 181, RSb, and 182, closing hold-in contact Rg which keeps relay $R_1$ energized through 173, Rg, 180, 181, RSb, and 182. The drive motor 115 is energized through 173, $R_1h$, 183, 184, 185, and 174, and runs as long as relay $R_1$ is energized. Solenoid 143, on the control unit, is momentarily energized through 173, 175, PBf, 186, 187 and 174, releasing one-turn clutch 141 which drives shaft 121 and its five timing cams.

A cam follower on switch A drops into a notch in cam $C_1$ closing A and energizing solenoid 11 through 173, 188, 189, 190, and 174, which opens the shutter exposing the sensitized paper. The exposure time is controlled by the length of the notch in cam $C_1$.

Cam $C_2$ momentarily closes switch B, energizing solenoid 144 through 173, 188, 191, and 174, which releases a one-half turn clutch which drives the mechanism for lowering the tank roller into the tank.

Cam $C_3$ closes switch C, energizing solenoids 159 and 146 through wires 173, 188, 192, and 174. Solenoid 159 releases the clutch which drives the sensitized paper pulldown and closes the edge flashing light so that the area of the sensitized paper needed for the next exposure is not fogged. The weight of the tank roller carries the paper being pulled off the supply roll into the tank of developer. At the same time, solenoid 146 releases the pressure on the transfer pressure roller on the carriage.

Cam $C_4$ momentarily closes switch D, energizing solenoid 145 through 173, 194, and 174. This solenoid swings roller 53 up to lift the paper off the glass plate so it can be pulled out of the developing tank. Simultaneously, solenoid 147 is energized through 173, 194, 185, and 174, releasing a clutch which drives the sensitized paper takeup through a friction clutch to compensate for variable roll size, pulling the developed print out of the tank.

Cam $C_5$ momentarily closes switch E, energizing relay $R_2$ through 173, 195, and 181, closing hold-in contact $R_2j$ which keeps relay $R_2$ energized through 173, 196 $R_2j$, 181, and 174. Solenoid 142 which releases the clutch driving the second shaft on the control unit, is energized through 173, 196, $R_2k$, 197, and 174. At the same time, the motor PM driving the pump P which fills the trough is energized through 173, 196, $R_2k$, 197, 198, 199, 200, RSa, 182, and 174.

Cam $C_6$ momentarily closes switch F, energizing solenoid 148 through 173, 201, 199, 200, RSa, 182, and 174. Solenoid 148 releases a one-turn clutch which drives the carriage down and up.

When the carriage starts down, it closes switch M, and at the end of its down stroke closes switch L, energizing relay $R_3$ through 173, 188, L, M, 202, 200, RSa, 182, and 174 closing hold-in contact 1, which keeps relay $R_3$ energized through 173, 1, 203, M, 202, 200, RSa, 182 and 174. Switch L is opened when the carriage begins its up stroke and M is opened at the end of this stroke, releasing relay $R_3$. While $R_3$ is energized, solenoid 149 is also energized through 173, M, 204, 200, RSa, 182, and 174, keeping the clutch released which drives the supply roll of transfer paper through a friction clutch, to compensate for variation in the size of the roll of paper, stripping the transfer paper from the sensitized paper as the carriage is driven up.

Cam C7 closes switch G, energizing solenoid 109 through 173, G, 205, 200, RSa, 162, and 174, which lifts the deflection vane to deflect the waste strip down so that it drops on the sensitized paper when it is cut off.

Cam C8 closes switch H, energizing solenoid 132 through 173, H, 206, 200, RSa, 162, and 174. Solenoid 132 releases the clutch which drives the transfer paper pull roller. The roller makes one turn pulling down the waste strip.

Cam C9 closes switch J, energizing solenoid 133 through 173, J, 207, 200, RSa, 162, and 174. Solenoid 133 releases the one-turn clutch which drives the knife and cuts off the waste strip.

Another notch in cam C8 closes switch H, energizing solenoid 132 which releases the clutch driving the transfer paper pulldown roller three turns to pull the finished print off the supply roll. The deflection vane directs the print into the conveyor which carries it to the top of the machine after it is cut off.

A second notch in cam C9 closes switch J, energizing solenoid 133, releasing the clutch on the knife, thus cutting off the print.

Cam C10 closes switch K, energizing the stepswitch coil RS through 173, K, 208, 162, and 174. One print having been made, the stepswitch steps down one step.

Relay R2, still being energized, keeps solenoid 142 energized and allows the second shaft on the control unit to begin another revolution. The carriage again is driven down to make a second transfer from the same negative. As the carriage begins its downward stroke, the trough which was filled by the pump when the first print was made, is dumped behind roller dam 195 to rewet the negative as the carriage goes down. The second print is stripped off and cut off the same as the first print was.

When the last print has been cut off, the step relay is energized again as it was before, this time stepping down to zero, opening contacts RSa, RSb, RSc, and closing RSd.

Solenoid 144 is energized through 173, 175, RSd, 209, N, and 174, releasing the clutch which drives the mechanism picking up the tank roller so the roller is not in contact with the paper when the machine is idle. As soon as the clutch starts driving the sliding member of the roller lift, switch N is opened, releasing solenoid 144.

Relay R2, still energized, allows the second shaft on the control mechanism to continue turning. Another transfer is not made, however, because the open contact RSa prevents the switches F, G, H, and J from closing a circuit to their respective solenoids. The pump motor stops also because RSa is in its circuit.

While this shaft is making another revolution, the print is carried to the top of the machine by the conveyor.

Cam C10 closes switch K, energizing the step relay coil, indexing the switch one more step which opens contact RSb, releasing relays R1 and R2. Relay R2 releases solenoid 142 and relay R1 stops the motor.

The operation of the machine, in spite of its rather complicated appearance, is extremely simple. In order to make a reproduction, the switch LS is closed and the indicating light IL comes on, showing the machine is in condition for operation. A sheet of copy material is then laid on the platen 5, being held flat by suitable means, and the objective 6 forms an image thereof on the sensitized paper 20 lying over the exposure aperture 8. This paper has been previously provided with a latent image which produces the border shown at WS in Fig. 21, so that a central area PA is left unfogged to receive the image of the copy material. The exposure is automatically made and concluded and the paper is advanced by the measuring rolls 23 and 24 while the developing roller 28 is being lowered into contact with the paper loop 20-a and released to carry down the paper in the developing solution S of tank 29. It automatically remains in this solution the required time and is drawn up over the inclined plate 54 while still wet and is supported above the inclined plate by means of the rollers 53 and 55. The carriage carrying the receiving sheet 71 then moves downwardly, the roller 70 smoothly rolling the receiving sheet against the wet developed paper sheet 20 so that the receiving sheet may receive an image through this contact with the sheet. When the carriage reaches its lowermost position, bucket 99 is filled with developing solution, and, as the carriage moves upwardly to remove the receiving sheet from the negative-bearing sheet, the paper is in a substantially dry condition. The unwanted areas, which are the fogged areas above described, are then chopped off and the finished print is passed outwardly at 112 from the machine by means of a conveyor belt 111 and guide plate 110. If the machine has been set for additional copies, the carriage, with the receiving paper, may again move downwardly, and as this is done, the measure of solution in the developing tray 90 is dumped upon the negative paper on the inclined plate 54 in advance of the rolling down movement of the receiving sheet. Thus, a second print, and a third, and so on, may be made (up to a limited number) without making another exposure by merely rewetting the negative before each fresh area of receiving sheet is ironed thereon. If only one copy is required, the cycle is repeated, as first described above. The parts of the machine are all operated in timed relation through the circuit shown in Fig. 18, and no attention is required on the part of the operator.

It will be seen that we have described and illustrated a machine with which the various objects of the present invention can be achieved and which is well adapted to meet conditions of practical use.

As various possible embodiments may be readily made, and as various changes may be made in the embodiments above set forth, it is to be understood that the matter herein set forth and shown in the accompanying drawings is to be interpreted as illustrative only and not in a limiting sense.

We claim:

1. In a machine for making prints from wet negatives by bringing receiving paper in contact with the negative under pressure to receive an image therefrom, the combination with a support for a strip of light-sensitive material bearing a negative latent image upon the strip material, a moving means for moving the latent image bearing strip to a developing station, a developing tank at the developing statoin, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving paper and negative together with the latter upon the inclined plate.

2. In a machine for making prints from wet negatives by bringing receiving paper in contact with the negative under pressure to receive an image therefrom, the combination with a support for a strip of light-sensitive material bearing a negative latent image upon the strip material, a negative moving means for moving the latent image bearing strip to a developing station, a devolping tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for reversibly moving the carriage back and forth over the inclined plate to press receiving paper upon, and strip it from, the negative when the pressure roller presses the receiving paper on the negative and the latter on the inclined plate in movement in one direction and strip the receiving paper from the negative in moving in a reverse direction.

3. In a machine for making prints from wet negatives by bringing receiving paper in contact with the negative under pressure to receive an image therefrom, the combination with a support for a strip of light-sensitive material bearing a negative latent image upon the strip material, a strip moving means for moving the latent image bearing strip to a developing station, a developing tank at the developing station, a developing roller, a moveable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving sheet and negative together with the latter upon the inclined plate, a knife under which the print-bearing receiving paper passes, means for operating the knife, and a conveyor for moving a print cut off by the knife to a delivery aperture in the machine.

4. In a machine for making prints from wet negatives by bringing receiving paper in contact with the negative under pressure to receive an image therefrom, the combination with a support for a strip of light-sensitive material bearing a latent image upon the strip material, a strip moving means for moving the latent image strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving paper and negative together with the latter upon the inclined plate, a border printing mechanism through which the negative passes before reaching the developing tank including slotted tubes and means for moving the tubes to provide longitudinal and transverse exposed areas on the negative, a knife under which the receiving paper passes, means for operating the knife in timed relation to the movement of the paper, once to chop off waste transversely exposed areas and a second time to chop off the image-bearing area of the receiving paper.

5. In a machine for making prints from wet negatives by bringing receiving paper in contact with the negative under pressure to receive an image therefrom, the combination with a support for a strip of light-sensitive material bearing a negative latent image upon the strip material, a negative strip moving means for moving the latent image bearing strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving paper and negative together with the latter upon the inclined plate, a pressure roll support including levers carrying bearings for the roller, mechanism for increasing the pressure between the roller and inclined plate comprising a pawl and ratchet advanced cam, said carriage by moving over the inclined plate in one direction moving the ratchet through the pawl.

6. In a machine for making prints from wet negatives by bringing receiving paper in contact with the negative under pressure to receive an image therefrom, the combination with a support for a strip of light-sensitive material bearing a negative latent image upon the strip material, a strip moving means for moving the latent image bearing strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving paper and negative together with the latter upon the inclined plate, a pressure roll support including levers carrying bearings for the roller, mechanism for increasing the pressure between the roller and inclined plate comprising a pawl and ratchet advanced cam, said carriage by moving over the inclined plate in one direction moving the ratchet through the pawl, a spring for normally holding the ratchet in one position, and means for releasing the pawl.

7. In a machine for making prints from wet negatives by bringing receiving paper in contact with the negative under pressure to receive an image therefrom, the combination with a support for a strip of light-sensitive material bearing a negative latent image upon the strip material, a negative strip moving means for moving the latent image bearing strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving paper and negative together with the latter upon the inclined plate, a spring for normally holding the ratchet in a rest position in which least pressure is applied to the roller, a solenoid actuated pawl release operable in timed relation to the negative paper moving means for releasing the ratchet for movement by its spring.

8. In a machine for making prints from wet negatives by bringing receiving paper in contact with the negative under pressure to receive an image therefrom, the combination with a support for a strip of light-sensitive material bearing a negative latent image upon the strip material, a strip moving means for moving the latent image bearing strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage, the receiving paper passing around and being guided by the pressure roller and means for moving the carriage to cause said pressure roller to press the receiving paper and negative together with the latter upon the inclined plate, a pressure roll support including levers carrying bearings for the roller pivoted transversely of the roller, springs engaging said levers to press the roller against the inclined plate, and cam controlled plungers for varying the pressure of the springs, and a pawl and ratchet for moving the cam actuated by the roller carrying carriage.

9. In a machine for making prints from wet negatives by bringing receiving paper in contact with the negative under pressure to receive an image therefrom, the combination with a support for a strip of light-sensitive material bearing a negative latent image upon the strip material, a strip moving means for moving the latent image bearing strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a carriage slideable over the plate, a pressure roller supported by the carriage, a support for a roll of receiving paper carried by the frame, a receiving paper advancing mechanism carried by the frame, a loop of receiving paper being threaded from the roll, about the pressure roll, and to the paper advancing mechanism, said carriage by sliding over the inclined plate moving the pressure roll and the receiving paper carried thereby upon the developed negative lying on the plate in moving in one direction, mechanism for driving the carriage in two directions back and forth, the movement of the carriage in the other direction removing the receiving paper from the negative, the receiving paper advancing mechanism moving the receiving paper which was pressed against the negative from the negative.

10. The machine for making prints from wet negatives defined in claim 9 characterized by the receiving paper advancing mechanism comprising a pair of wringer rolls, and means for operating the carriage and wringer rolls in timed relation.

11. The machine for making prints from wet negatives defined in claim 9 characterized by the receiving paper advancing mechanism comprising a pair of wringer rolls, a paper chopper located adjacent the wringer rolls, and means for operating the carriage, the wringer rolls and the chopper in timed relation.

12. The machine for making prints from wet negatives defined in claim 9 characterized by the receiving paper advancing mechanism comprising a pair of wringer rolls, a paper chopper located adjacent the wringer rolls, a curved guide plate, a conveyor belt normally engaging the curved guide plate and passing over supporting rollers, and means for operating the carriage, the wringer rolls, and the chopper in timed relation, means for driving a supporting roller and the conveyor belt whereby movement of the carriage and wringer rolls may advance a printed area of the receiving paper to the chopper so that the chopper may cut off the print and the print may be moved by the conveyor belt from the chopper.

13. The machine for making prints from wet negatives defined in claim 9 characterized by a bucket pivotally mounted on the carriage, means for filling the bucket with processing solution from the developing tank when the carriage moves across the inclined plate to one end thereof, and means for dumping the solution at the opposite end of the inclined plate.

14. The machine for making prints from wet negatives defined in claim 9 characterized by, a bucket pivotally mounted on the carriage, means for filling the bucket with processing solution from the developing tank when the carriage moves across the inclined plate to one end thereof, a spring latch carried by the frame, a pin carried by the bucket to engage the spring latch and snap past it, moving when the carriage moves from a position over the plate, the latch rocking the tank and dumping the contents upon a negative lying on the inclined plate when the carriage is again moved across the plate.

15. The machine for making prints from wet negatives defined in claim 9 characterized by a bucket pivotally mounted on the carriage, means for filling the bucket with processing solution from the developing tank when the carriage moves across the inclined plate to one end thereof, a spring latch carried by the frame, a pin carried by the bucket to engage the spring latch and snap past it, moving when the carriage moves from a position over the plate, the latch rocking the tank and dumping the contents upon a negative lying on the inclined plate when the carriage is again moved across the plate, a squeegee mounted on the carriage for removing excess processing fluid from the negative as the carriage moves across the inclined plate and in advance of rolling the receiving paper thereon by the roller supported on the carriage.

16. In a machine for making prints from wet negatives by bringing receiving paper in contact with the negative under pressure to receive an image therefrom, the combination with a support for a strip of light-sensitive material bearing a negative latent image upon the strip material, a strip moving means for moving the latent image bearing strip to a developing station, a developing tank at the developing station, a developing roller, a movable support for the developing roller operable to engage and release the roller, means for releasing the developing roller to submerge an exposed area of the negative material in the developing tank, an inclined plate leading from the developing tank, rollers for supporting a length of developed negative above the inclined plate, a negative winding device to move a developed area of the negative material above the inclined plate, a support for receiving paper, a carriage slideable over the plate, a pressure roller supported by the carriage over which the receiving paper is guided, said pressure roller being adapted to press the receiving sheet into contact with the inclined plate, a second roller pivotally carried by the carriage and held thereby out of contact with the plate, the negative paper passing over the second roller and under the pressure roller whereby the latter may press the negative, normally held above the plate by the second roller, into contact with the plate as the carriage moves across the inclined plate in one direction as the pressure roller presses the receiving paper against the negative.

17. The machine for making prints from wet negatives defined in claim 16 characterized by a bucket pivotally mounted on the carriage, means for filling the bucket with processing solution from the developing tank when the carriage moves across the inclined plate to one end thereof, a spring latch carried by the frame, a pin carried by the bucket to engage the spring latch and snap past it, moving when the carriage moves from a position over the plate, the latch rocking the bucket and dumping the contents upon a negative lying on the inclined plate when the carriage is again moved across the plate, a roller dam pivotally supported by the carriage substantially under the bucket, whereby the solution of the bucket may lie behind the roller dam and may spread over the negative lying on the inclined plate as the carriage moves downwardly thereover, and means for operating the carriage.

18. The machine for making prints from wet negatives defined in claim 16 characterized by a bucket pivotally mounted on the carriage, means for filling the bucket with processing solution from the developing tank when the carriage moves across the inclined plate to one end thereof, a spring latch carried by the frame, a pin carried by the bucket to engage the spring latch and snap past it, moving when the carriage moves from a position over the plate, the latch rocking the bucket and dumping the contents upon a negative lying on the inclined plate when the carriage is again moved across the plate, a roller dam pivotally supported by the carriage substantially under the bucket, whereby the solution of the bucket may lie behind the roller dam and may spread over the negative lying on the inclined plate as the carriage moves downwardly thereover, a second roller carried by the carriage out of contact with the inclined plate and spaced from the roller dam, a squeegee contacting the second roller axially thereof whereby solution from the tank may lie behind the roller dam and be squeegeed off the negative as the carriage moves downwardly across the inclined plate, to press the receiving paper into contact with the wetted and squeegeed negative and a power drive connected to the carriage through a crank intergeared to a rack carried by the carriage.

WILLIAM BORNEMANN.
DONALD J. ALBERT.

REFERENCES CITED

The following references are of record in the file of this patent:

UNITED STATES PATENTS

| Number | Name | Date |
| --- | --- | --- |
| 604,849 | Steiger | May 31, 1898 |
| 1,217,480 | Maynard | Feb. 27, 1917 |
| 1,661,157 | Ball | Mar. 6, 1928 |
| 1,682,931 | Rifer | Sept. 4, 1928 |
| 1,734,780 | Simjian | Nov. 5, 1929 |
| 1,795,050 | Simjian | Mar. 3, 1931 |
| 2,435,719 | Land | Feb. 10, 1948 |
| 2,457,319 | Rackett | Dec. 28, 1948 |
| 2,473,174 | Rifer | June 14, 1949 |